United States Patent [19]

Luz et al.

[11] 4,385,263

[45] May 24, 1983

[54] TELEVISION RECEIVER, PUSH-PULL INVERTER, FERRORESONANT TRANSFORMER POWER SUPPLY SYNCHRONIZED WITH HORIZONTAL DEFLECTION

[75] Inventors: David W. Luz; Donald H. Willis, both of Indianapolis, Ind.

[73] Assignee: RCA Corporation, New York, N.Y.

[21] Appl. No.: 174,943

[22] Filed: Aug. 4, 1980

[51] Int. Cl.³ .............................................. H01J 29/70
[52] U.S. Cl. .................... 315/411; 315/405; 315/396; 323/306
[58] Field of Search ...................... 315/396, 405, 411; 323/306

[56] References Cited

U.S. PATENT DOCUMENTS

| | | | |
|---|---|---|---|
| 2,763,827 | 9/1956 | Evans | 323/306 X |
| 3,056,077 | 9/1962 | McCarter | 321/45 |
| 3,418,602 | 12/1968 | Lauter, Jr. | 331/113 |
| 3,660,749 | 5/1972 | Kadri | 321/2 |
| 3,696,285 | 10/1972 | Saia | |
| 3,699,424 | 10/1972 | Hart et al. | 321/11 |
| 3,777,248 | 12/1973 | Vermolen | 321/2 |
| 3,818,314 | 6/1974 | Bishop et al. | 321/45 |
| 3,863,131 | 1/1975 | Muir | 321/2 |
| 3,891,800 | 6/1975 | Janssen et al. | |
| 3,967,182 | 6/1976 | Scott | 321/18 |
| 4,103,356 | 7/1978 | Finlay | 363/22 |
| 4,176,304 | 11/1979 | Scott | 315/411 |
| 4,240,013 | 12/1980 | Wedam | 315/411 |
| 4,262,245 | 4/1981 | Wendt | 323/308 |
| 4,301,394 | 11/1981 | Dietz | 315/411 X |

FOREIGN PATENT DOCUMENTS 3003321 7/1980 Fed. Rep. of Germany .
2041668 9/1980 United Kingdom .

OTHER PUBLICATIONS

Paper Presented at Convention of Institute of Engineers of Japan, Entitled "stabilized Power Supply Incorporating High-Frequency Ferroresonance Transformer", T. Kadota and other, dated 10-7-77.

Primary Examiner—Malcolm F. Hubler
Attorney, Agent, or Firm—E. M. Whitacre; P. M. Rasmussen; Joseph Laks

[57] ABSTRACT

A primary winding of a power transformer is coupled to a source of DC voltage. First and second controllable switches are coupled to the primary winding in a push-pull arrangement. A control circuit responsive to a deflection rate input signal that is synchronized with deflection circuit scanning applies a turn-off switching signal alternately to the two controllable switches during each deflection cycle. In response to the turnoff of each one of the two controllable switches, a turn-on switching signal is applied to the other switch to develop a deflection rate alternating polarity output voltage across an output winding of the power transformer. The output voltage is rectified and applied to a deflection generator to thereby energize the generator into developing scanning current in a deflection winding.

29 Claims, 6 Drawing Figures

TELEVISION RECEIVER, PUSH-PULL INVERTER, FERRORESONANT TRANSFORMER POWER SUPPLY SYNCHRONIZED WITH HORIZONTAL DEFLECTION

This invention relates to synchronized push-pull power supplies.

The power supply of a television receiver provides a B+ supply voltage to energize a deflection generator into developing scanning current in a deflection winding. To obtain relative high efficiencies and reduce the bulk and weight of the power supply, switching inverters may be used to excite relatively compact power transformers. In some inverter power supplies, the power transformer may also include a high voltage winding used to develop the ultor accelerating potential of the television receiver picture tube.

To regulate the output voltages developed across the power transformer secondary windings, U.S. Patent Application Ser. No. 144,150, filed Apr. 28, 1980, by F. S. Wendt entitled "High Frequency Ferroresonant Power Supply for a Deflection and High Voltage Circuit", now U.S. Pat. No. 4,319,167, describes the use of a ferroresonant transformer as the power transformer of a television receiver inverter supply. Because of the relatively large leakage inductances that may exist between the primary winding and the secondary windings of the ferroresonant transformer, the inverter portion of the power supply may be designed as a push-pull arrangement in order to avoid impressing unduly large voltages across the inverter switches during switching transitions.

A feature of the invention is to design a push-pull inverter for a power transformer, such as a ferroresonant transformer, which is operated synchronously with deflection circuit scanning. A primary winding of the power transformer is coupled to a source of DC voltage. First and second controllable switches are coupled to the primary winding in a push-pull arrangement. A control circuit responsive to a deflection rate input signal synchronized with deflection applies a turn-off switching signal alternately to the two controllable switches during each deflection cycle. In response to the turnoff of each one of the two controllable switches, a turn-on switching signal is applied to the other switch to develop a deflection rate alternating polarity output voltage across an output winding of the power transformer. The output voltage is applied to energize a television load circuit.

In a specific embodiment, the turn-off switching signal is developed across a secondary winding of a signal transformer having a primary winding coupled in the path of the scanning current. The scanning current saturates the magnetizable core of the signal transformer during the entire deflection cycle except during those portions that encompass the zero-crossover instants of the scanning current. Near the zero-crossover instants, the signal transformer comes out of saturation, thereby developing an output voltage across the secondary winding. The output voltage of the signal transformer is then applied to the two controllable switches so as to alternately turn off the switches. One switch is turned off during the trace interval of each deflection cycle, the other during the retrace interval.

In a further specific embodiment, a drive winding of the power transformer is coupled to the control electrodes of the two switches. When one of the two switches is turned off, the voltage across the drive winding reverses polarity such that a turn-on signal is applied to the other switch. The undesirable, simultaneous conduction of both switches is thereby substantially eliminated.

During television receiver start-up, before the deflection generator is energized to develop the scanning current used to produce the inverter switch turn-off signals, the push-pull inverter arrangement operates in the free-running mode. In the free-running mode, current in the power transformer primary winding increases in magnitude to a point where a further increase in power transformer primary winding current results in a decrease in the magnitude of the voltage applied thereacross. The voltage developed across the drive winding that provides forward drive to the conducting switch also decreases, resulting in a regenerative action which turns off the conducting switch. Subsequently, a voltage polarity reversal across the primary and drive windings occurs, resulting in the turning on of the nonconducting switch.

In a different embodiment of the invention, alternate turnoff of the two controllable inverter switches is accomplished by means of two shunting transistors, each coupled in shunt with the base-emitter current path of a respective inverter switch. A control signal of predetermined frequency alternately activates the shunt transistors. Each shunt transistor, when activated, conducts reverse base-emitter current of its respective inverter switch to turn the switch off, thereby establishing inverter operation at the predetermined frequency.

Figure 1:
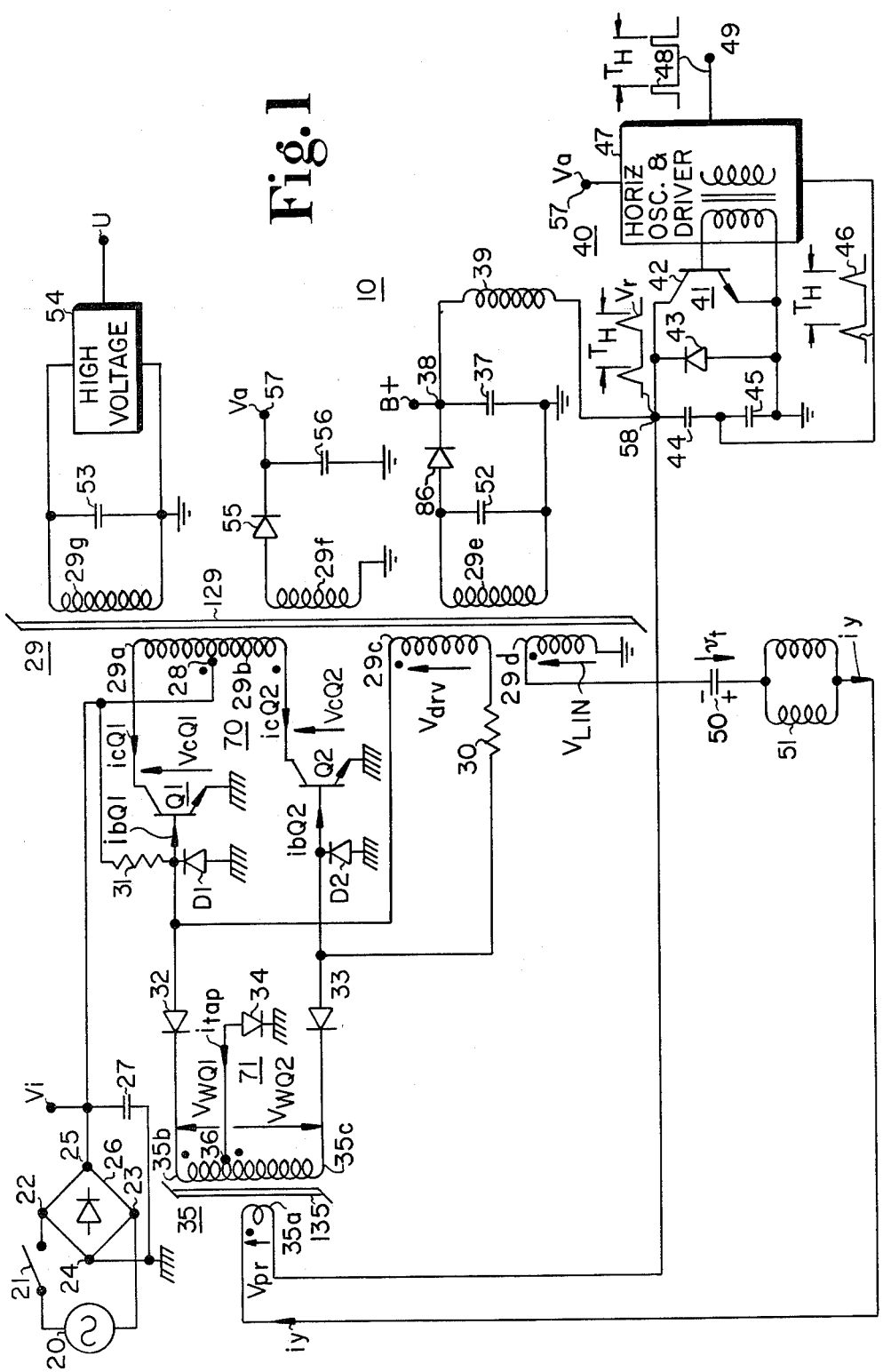
FIG. 1 illustrates a deflection circuit with a synchronized push-pull power supply embodying the invention.

In a television receiver deflection circuit with synchronized power supply 10 of FIG. 1, a mains supply voltage source 20 is coupled to input terminals 22 and 23 of a full-wave bridge rectifier 26. Mains supply 20 is coupled to terminal 22 through a mechanical on/off switch 21. A filter capacitor 27 is coupled between output terminal 25 of full-wave bridge rectifier 26 and the current return terminal 24. Current return terminal 24 comprises an earth ground that is not conductively isolated from the mains supply 20. A filtered, but unregulated, DC input voltage, $V_i$, is developed at terminal 25 relative to earth ground.

The unregulated DC input voltage $V_i$ is applied to the center tap terminal 28 of the primary winding of a power transformer 29. The primary winding of power transformer 29 comprises two winding sections 29a and 29b having a common end terminal at center tap 28. Each of the other end terminals of primary winding sections 29a and 29b is coupled to a respective collector electrode of two controllable switch transistors Q1 and Q2 of an inverter 70. Transistors Q1 and Q2 have their emitter electrodes in common with the earth ground.

Transistors Q1 and Q2 are arranged in a push-pull configuration, being alternately switched into conduction to apply the DC input voltage $V_i$ alternately across primary winding sections 29a and 29b. The switching action of inverter transistors Q1 and Q2 produces alternating polarity output voltages across output windings 29e–29g of power transformer 29. The output voltage developed across output winding 29f is rectified by diode 55 and filtered by capacitor 56 to develop a DC output voltage $V_a$ at a terminal 57. Output winding 29g comprises a high voltage winding coupled across a high voltage circuit 54. High voltage circuit 54 develops a DC ultor accelerating potential at a terminal U for the picture tube of the television receiver from the voltage developed across high voltage winding 29g.

The output voltage developed across winding 29e is rectified by a diode 86 and filtered by a capacitor 37 to develop a B+ operating voltage at a terminal 38 for energizing a deflection generator 40. Terminal 38 is coupled through an input choke 39 to the collector of a horizontal output transistor 42 at a deflection generator terminal 58. Deflection generator 40 comprises a horizontal oscillator and driver 47, a trace switch 41 comprising horizontal output transistor 42 and a damper diode 43, and a retrace capacitor arrangement comprising the series coupled retrace capacitors 44 and 45. Also coupled across trace switch 41 is the series arrangement of a power transformer winding 29d, a trace capacitor 50, a horizontal deflection winding 51 and the primary winding 35a of a signal transformer 35. Supply voltage for horizontal oscillator and driver 47 is obtained from the $V_a$ output terminal 57.

When energized by the B+ voltage at terminal 38, deflection generator 40 develops a trace voltage $v_t$ across trace capacitor 50. Trace switch 41 applies the trace voltage $v_t$ to horizontal deflection winding 51 during the trace interval of each deflection cycle to generate a scanning current $i_y$ in deflection winding 51. Towards the end of the trace interval, horizontal oscillator and driver 47 applies a reverse bias signal to horizontal output transistor 42 to cut off conduction of the output transistor and initiate the horizontal retrace interval. During the horizontal retrace interval, a retrace pulse voltage $V_r$ is developed at terminal 58 and a retrace pulse timing signal 46 is developed across retrace capacitor 45.

To synchronize deflection scanning with the picture content of the television receiver video signal, retrace pulse signal 46 and a horizontal synchronizing pulse signal 48, developed at a terminal 49, are applied to the phase comparator, not illustrated, of horizontal oscillator and driver 47. The phase comparator adjusts the phase of the signal applied to horizontal output transistor 42 so as to maintain the required picture synchronization.

To regulate the output voltages developed across output windings 29e–29g, power transformer 29 may be constructed as a ferroresonant power transformer with the windings 29e–29g wound around a portion of the transformer core 129 that magnetically saturates during each half cycle of the alternating polarity output voltage. A capacitor 52 is coupled across output winding 29e or a capacitor 53 is coupled across output winding 29g to provide circulating current which generates a magnetic flux that aids in saturating the core portions under windings 29e–29g. The design and construction of a ferroresonant power transformer 29, including one with a high voltage winding 29g, may be similar to that described in the U.S. Patent Application of F. S. Wendt, Ser. No. 144,150, filed Apr. 28, 1980, entitled "High Frequency Ferroresonant Power Supply for a Deflection and High Voltage Circuit", now U.S. Pat. No. 4,319,167, hereby incorporated by reference, or may be similar to that described in the U.S. Patent Application of F. S. Wendt, Ser. No. 007,814, filed Jan. 30, 1979, entitled "High Frequency Ferroresonant Transformer", hereby now U.S. Pat. No. 4,262,245 also incorporated by reference.

When using a ferroresonant power transformer 29, the regulated output windings 29e–29g are loosely coupled magnetically with primary winding sections 29a and 29b. Windings 29c and 29d, not being used to developed DC supply voltages, may be tightly coupled magnetically with primary winding sections 29a and 29b. To develop alternating output voltages across the output windings 29e–29g from the DC voltage $V_i$ applied to primary winding sections 29a–29b, an inverter 70, configured as a push-pull arrangement, is desirable to prevent the leakage inductances of ferroresonant transformer 29 from unduly stressing switching transistors Q1 and Q2 during the switching transitions.

Push-pull inverter 70 comprises inverter switching transistors Q1 and Q2 and a turn-off control circuit 71 for applying a negative, turn-off switching signal to the bases of transistors Q1 and Q2 through diodes 32 and 33, respectively. Push-pull inverter 70 also includes a drive winding 29c of power transformer 29 having one end terminal coupled to the base of transistor Q1 and the other end terminal coupled through a base resistor 30 to the base of transistor Q2. A diode D1 is coupled across the base and emitter electrodes of transistor Q1 with the cathode of diode D1 coupled to the base electrode. A diode D2 is coupled across the base and emitter electrodes of transistor Q2, with the cathode of diode D2 coupled to the base electrode of transistor Q2.

Control circuit 71 comprises a base turn-off signal transformer 35 including a primary winding 35a having deflection current $i_y$ flowing therein and including two secondary windings 35b and 35c. An end terminal of each secondary winding 35b and 35c is coupled to a respective cathode of the diodes 32 and 33. The other end terminals of windings 35b and 35c are coupled together at an intermediate tap terminal 36. Tap terminal 36 is coupled to earth ground through a diode 34 with the cathode of diode 34 being coupled to the earth ground.

With signal transformer primary winding 35a being coupled in series with horizontal deflection winding 51, the horizontal scanning current $i_y$ flows in the signal transformer primary winding, generating a flux in the magnetizable core 135. Signal transformer 35 is so constructed that the scanning current $i_y$ in primary winding 35a maintains magnetizable core 135 in magnetic saturation during the entire horizontal deflection cycle except during those portions of the deflection cycle that encompass the zero-crossover instants of the scanning current. As illustrated by the scanning current $i_y$ in FIG. 2A and by the voltage $V_{pr}$ across signal transformer primary winding 35a of FIG. 2B, the voltage across primary winding 35a is zero except near time $T_1$, the zero-crossover instant of the scanning current during the retrace interval $t_a$–$t_b$, and except near the zero-crossover instant $t_1$ during the trace interval $t_b$–$t_c$.

Near the retrace instant $T_1$, magnetizable core 135 comes out of saturation. The scanning current $i_y$ induces a negative voltage 90 across primary winding 35a as illustrated in FIG. 2B. Near the trace instant $t_1$, magnetizable core 135 again comes out of saturation, producing the positive voltage 91. Similarly, after core 135 comes out of magnetic saturation, the changing flux in the core produced by the scanning current $i_y$ induces voltages across the signal transformer secondary windings 35b and 35c near the zero-crossover instants $T_1$ and $t_1$ of the scanning current. As illustrated in FIG. 2d by the voltage $V_{wQ1}$ developed across secondary winding 35b and as illustrated in FIG. 2E by the voltage $V_{wQ2}$ developed across secondary winding 35c, a negative voltage 190, referenced to tap terminal 36, is induced across secondary winding 35b near retrace instant $T_1$ and a positive voltage 290, referenced to tap terminal 36, is induced across secondary winding 35c. Near trace instant $t_1$, a positive voltage 191 is induced across secondary winding 35b and a negative voltage 291 is induced across secondary winding 35c.

The negative voltage 190 is applied as a turn-off switching signal to the base of inverter transistor Q1 during retrace, and the negative voltage 291 is applied as the turn-off switching signal to the base of inverter transistor Q2 during the trace interval. Thus, the turn-off switching signal applied by the signal transformer secondary windings 35b and 35c alternately turns off the two controllable switches, turning off transistor Q2 near the center of trace, near time $t_1$, and turning off transistor Q1 near the center of retrace, near time $T_1$.

Deflection synchronized operation of inverter 70 for one cycle of operation will now be described with the aid of the waveforms of FIGS. 2–4. FIGS. 3A–3E illustrate some of the waveforms of FIG. 2 in an expanded time scale centered around the center of trace instant $t_1$, and FIGS. 4A–4E illustrate the same waveforms in an expanded time scale around the center of retrace instant $T_1$.

Consider operation of inverter 70 during the trace interval. Immediately prior to time $t_0$, the deflection current $i_y$ flowing in signal transformer primary winding 35a is sufficiently great to maintain the signal transformer core 135 in magnetic saturation. As illustrated in FIG. 3B, prior to time $t_0$, the voltage $V_{wQ2}$ is zero as is the current $i_{tap}$ flowing from intermediate terminal 36 to earth ground through diode 34. The voltage $V_{drv}$ developed across drive winding 29c of power transformer 29 is positive at the undotted terminal, thereby generating forward base drive current 292 of FIG. 3D to inverter transistor Q2 to maintain the transistor in saturated conduction. The forward base current drive circuit for transistor Q2 begins, for example, at the undotted terminal of drive winding 29c, through base resistor 30, the base-to-emitter junction in the forward direction of transistor Q2, diode D1, to the dotted terminal of drive winding 29c. At the same time, drive winding 29c maintains the base-to-emitter junction of the other inverter transistor, transistor Q1, reverse biased. Base resistor 30 functions to reduce variations in forward base current as the unregulated input voltage $V_i$ varies. Diode 34, by providing an additional voltage barrier drop, prevents the forward drive current from drive winding 29c from flowing in signal transformer secondary winding 35c.

With transistor Q2 in saturated conduction, the input voltage $V_i$ is applied across power transformer primary winding section 29b. A positive-going or increasing current flows in winding section 29b and in the collector of transistor Q2, as illustrated by the collector current $i_{cQ2}$ of FIG. 2H immediately prior to time $t_1$.

After time $t_0$ of FIGS. 3A–3E, the negative scanning current $i_y$ has decreased sufficiently in magnitude to bring the core 135 of signal transformer 35 out of magnetic saturation to produce a negative voltage across signal transformer secondary winding 35c in accordance with the changing magnetic flux produced in the core by the scanning current $i_y$. The negative secondary winding voltage $V_{wQ2}$ generates a negative or reverse base current in inverter transistor Q2 after time $t_0$, as illustrated by the current $i_{bQ2}$ of FIG. 3D. Current in signal transformer secondary winding 35c flows from the intermediate tap terminal 36 to earth ground through diode 34, through the base-emitter junction of transistor Q2 in the reverse direction, through diode 33 to the undotted terminal of winding 35c. The forward drive current from drive winding 29c that had been flowing to the base of transistor Q2 is now shunted away from the base to diode 33, thence through winding 35c, diode 34, diode D1 and returned to drive winding 29c.

Transistor Q2 remains in saturated conduction, even after time $t_0$, until time $t_2$ while the charge stored in the base region of the transistor is being swept out by the reverse base conduction and the forward collector conduction of transistor Q2. Near time $t_2$ all the base charge of transistor Q2 has been swept out and the transistor becomes cut off, as illustrated by the zero base current $i_{bQ2}$ of FIG. 3D after time $t_2$. By proper selection of circuit values, such as the resistance value of base resistor 30, the cutoff instant of transistor Q2 may be made to nearly coincide with the zero-crossover instant $t_1$ of the yoke current $i_y$. As illustrated in the shorter time scale waveform FIGS. 2H and 2I, the collector current $i_{cQ2}$ of transistor Q2 goes to zero near time $t_1$, the center of trace, and the collector voltage $V_{cQ2}$ correspondingly rises. As illustrated in the expanded time scale waveform FIG. 3E, the drive voltage $V_{drv}$ of drive winding 29c remains negative at the dotted terminal until the cutoff of transistor Q2 collector current near time $t_2$, at which time the drive voltage $V_{drv}$ undergoes a polarity reversal to become a positive voltage after time $t_2$.

The polarity reversal across drive winding 29c near time $t_2$ makes the dotted terminal of the winding positive, thereby applying a forward biasing voltage to the other inverter transistor, transistor Q1. After time $t_2$, drive winding 29c provides forward base drive current to transistor Q1, the current path being the dotted terminal of the drive winding, the base-emitter junction in the forward direction of transistor Q1, diode D2, base resistor 30, to the undotted terminal of drive winding 29c.

Diode D2 also conducts the current flowing in signal transformer secondary winding 35c from time $t_2$ until time $t_3$, as illustrated in FIG. 3C by the current $i_{tap}$. After time $t_3$, the positive scanning current $i_y$ has increased sufficiently in magnitude to magnetically saturate core 135 of signal transformer 35. Both the secondary winding voltage $V_{wQ2}$ and the current in the secondary winding is zero after time $t_3$.

The exciting source for signal transformer 35 is substantially a current source, the deflection winding 51, that provides a scanning current $i_y$ as an exciting current to the primary winding 35a of signal transformer 35. The effect of load current flowing in signal transformer secondary winding 35c between times $t_0-t_1$ of FIGS. 3A–3E is to produce a magnetic flux in core 135 which tends to maintain the core in magnetic saturation for a longer period of time than would have been the case in an open-circuit secondary winding situation. Because the exciting source for the primary winding is a current source, the tendency for the load current to maintain the core in saturation will not be opposed by a responsive change in primary winding current. Thus, a relatively small secondary winding voltage $V_{wQ2}$ is developed across secondary winding 35c between times $t_0 - T_1$ of FIG. 3B. After time $t_1$, the instant that the scanning current $i_y$ reverses direction, the load current flowing in signal transformer secondary winding 35c produces a magnetic flux in core 135 that links the primary and secondary windings of a polarity that opposes the flux linking the two windings that is produced by the scanning current $i_y$. The load current after time $t_1$ thus opposes the tendency of the positive scanning current to again magnetically saturate the core.

During the interval $t_0 - t_2$, while reverse base current flows in transistor Q2, the voltage across secondary winding 35c is negative and equals $v_{be} - 2v_d$, where $v_{be}$ and $v_d$ are respectively the dynamic voltage drops across a transistor base-to-emitter junction and a diode pn junction. When transistor Q2 becomes cut off near time $t_2$, diode D2 becomes forward biased into conducting current through secondary winding 35c. The negative voltage across secondary winding 35c between times $t_2 - t_3$ equals $-3v_d$. Due to the B-H loop characteristic of the core material of signal transformer 35, the peak voltages developed across the signal transformer secondary windings will be delayed until some time after the zero-crossover instants of the scanning current $i_y$.

As illustrated in FIGS. 2G–2I, transformer Q2 becomes cut off slightly after time $t_1$, resulting in a polarity reversal of the drive voltage $V_{drv}$ of FIG. 2L. Current that was flowing in primary winding section 29b out of the dotted terminal to the collector of transistor Q2 prior to time $t_1$ now flows after the cutoff of transistor Q2 out of the dotted terminal of the other primary winding section 29a towards input terminal 25. As illustrated in FIGS. 2J and 2K, the current in primary winding section 29a after time $t_1$ flows as a negative or reverse collector current $i_{cQ1}$ in transistor Q1. The current path is from earth ground through diode D1, acting as a damper diode, the base-to-collector junction of transistor Q1, primary winding section 29a, center tap terminal 28 to the input terminal 25, and thence to earth ground through capacitor 27. The reverse collector current in transistor Q1 flowing after time $t_1$ is also illustrated in the base current waveform $i_{bQ1}$, FIG. 2F, as a current spike 193, of duration approximately equal to the duration of the negative portion of the collector current $i_{cQ1}$. With the voltage $V_{cQ1}$ at the collector electrode of transistor Q1 substantially at earth ground, the voltage applied across primary winding section 29a equals the input voltage $V_i$, positive at the dotted terminal, thereby producing a positive-going collector current $i_{cQ1}$.

By coupling damper diode D1 from earth ground to the base electrode of transistor Q1, rather than from earth ground to the collector electrode of transistor Q1, the damper diode current flows from the base electrode to the collector electrode of the transistor, depositing charge in the base region. When the collector current $i_{cQ1}$ reverses direction at an instant within the trace interval between times $t_1 - t_c$ of FIG. 2J, subsequent positive collector current can be supported by the stored charge in the base region, thereby reducing the forward base-to-emitter current 192 of FIG. 2F that drive winding 29c must supply and that must later be shunted to a respective one of signal transformer secondary windings 35b and 35c. Also, since damper diode D1 is coupled to the base electrode of transistor Q1, it is not required to withstand the relatively large voltage stress that is developed at the collector in the off-state of the transistor.

Transistor Q1 continues conducting in a saturated state until near time $T_1$, the zero-crossover instant of the deflection current $i_y$ during retrace. Near retrace instant $T_1$, the core of signal transformer 35 comes out of saturation, producing a negative voltage across secondary winding 35b that generates a reverse base current in transistor Q1 in order to cut off conduction of the transistor in a manner similar to the switching off of the other transistor Q2, previously described.

The sequence of events within retrace occurring between times $T_0 - T_3$ of FIG. 4E, resulting in the switching off of transistor Q1 and the switching on of transistor Q2, corresponds to the similar sequence of events within trace occurring between times $t_0 - t_3$ of FIG. 3E resulting in the switching off of transistor Q2 and the switching on of transistor Q1. In FIGS. 4A–4E, after times $T_0$, the deflection current $i_y$ has decreased sufficiently to bring the signal transformer core 135 out of magnetic saturation to produce a negative output voltage 190 across signal transformer secondary winding 35b, as illustrated in FIGS. 4A and 4B. The forward base current 192 of FIG. 4D turns into a reverse base current somewhat after time $T_0$ and flows until time $T_2$, at which time transistor Q1 becomes cut off and the base current $i_{bQ1}$ equals zero. At time $T_2$, when transistor Q1 becomes cut off, the voltage across drive winding 29c reverses polarity and becomes a negative voltage at the dotted winding terminal, which is used to provide forward base current drive to the transistor Q2 to support forward collector conduction in transistor Q2 beginning at some instant after time $T_1$ of FIG. 2H. Between times $T_2 - T_3$ of FIGS. 4A–4E, diode D1 becomes forward biased by the negative voltage portion 190 of the voltage $V_{wQ1}$ across secondary winding 35b. Diode D1 conducts the current flowing in the secondary winding 35b out of intermediate tap terminal 36 to earth ground as illustrated by $i_{tap}$ of FIG. 4C between times $T_2 - T_3$. After time $T_3$, the scanning current $i_y$ is of sufficiently large magnitude to magnetically saturate signal transformer core 135, resulting in a zero secondary winding voltage $V_{wQ1}$.

After transistor Q1 becomes cut off near time $T_1$ of FIGS. 2J and 2K by the negative voltage developed across secondary winding 35b, current ceases to flow in primary winding section 29a and is taken up as a current in winding 29b, first as a negative reverse collector current in transistor Q2, as illustrated by the negative current $i_{cQ2}$ of FIG. 2H and as illustrated by the positive base current spike 293 of FIG. 2G. Current in winding 29b then flows as a positive forward collector current until the cycle repeats, beginning at time $t_1$, near the center of the next trace interval.

By using a saturable signal transformer 35 excited by the deflection winding current $i_y$, the turn-off instants of Q1 and Q2 are made to occur near the zero-crossover instants $T_1$ and $t_1$ of the retrace and trace intervals, respectively, thereby providing a substantially 50% duty cycle exciting voltage for primary winding sections 29a and 29b and 50% duty cycle output voltages across windings 29e–29g. In a ferroresonant power transformer, a 50% duty cycle exciting voltage is desirable to prevent the generation of second and higher even-order harmonic voltages across the transformer output windings. Even harmonics of the exciting frequency superimposed on the output voltage waveform of a ferroresonant transformer may undesirably affect the regulation of the DC output voltages such as the B+ voltage, the supply voltage $V_a$ and the DC ultor accelerating potential at terminal U.

It may be undesirable to use an asymmetrical duty cycle exciting voltage when using a push-pull inverter 70. Use of such an asymmetrical duty cycle may lead to the introduction of a DC component to the collector currents $i_{cQ1}$ and $i_{cQ2}$. Even a relatively small duty cycle asymmetry may result in a relatively large DC collector current flowing in one of the inverter transistors, undesirably dissipating power in the transistor and tending to force the transistor out of saturated conduction. By providing turn-off signals to the inverter transistors near the zero-crossover instants of the scanning current, a substantially 50% duty cycle drive is assured by proper selection of such component values as the resistance of base resistor 30, the resistor controlling the magnitude of both the forward and reverse base current flowing in the inverter transistors.

The beta or storage time delay of a given inverter transistor may vary from unit to unit, and thus, to a certain extent, the duty cycle of the inverter may also vary. If the amount of duty cycle variation produced by transistor beta variations is unacceptable, fixed base resistor 30 may be replaced by an adjustable one. Adjusting the value of the variable base resistor will adjust the turn-off delay of the inverter transistors to maintain a symmetrical 50% duty cycle inverter operation.

Synchronizing inverter switching with the zero-crossover instants of the scanning current $i_y$ is desirable when using power transformer winding 29d to provide scanning current linearity correction as described in the concurrently filed U.S. Patent Application, of D. H. Willis, Ser. No. 174,864 entitled "LINEARITY CORRECTED DEFLECTION CIRCUIT", now U.S. Pat. No. 4,321,511 hereby incorporated by reference. With windings 29c and 29d relatively tightly coupled magnetically, the voltage $V_{LIN}$ developed across winding 29d is similar in waveshape and in-phase with the voltage $V_{drv}$, illustrated in FIG. 2L, developed across drive winding 29c.

During the trace interval $t_b - t_c$ of the scanning current $i_y$ of FIG. 2A, the voltage applied across deflection winding 51 is the algebraic sum of the voltage $V_{LIN}$ and the trace voltage $v_t$ across trace capacitor 50. With $V_{LIN}$ reversing polarity near the center of trace instant $t_1$, the voltage applied across deflection winding 51 during the second half of trace is greater in magnitude than the voltage applied during the first half, thereby providing the required linearity correction.

Signal transformer 35 is constructed so as to provide sufficient secondary winding ampere turns to generate the relatively large peak reverse base current $i_{bQ1}$ and $i_{bQ2}$ of FIGS. 4D and 3D. The correspondingly large primary winding ampere turns requirement is relatively easily satisfied with a small number of turns because the scanning current flowing in primary winding 35a is relatively great. Using a relatively small number of primary and secondary winding turns simplifies the construction of the signal transformer.

Figure 5:
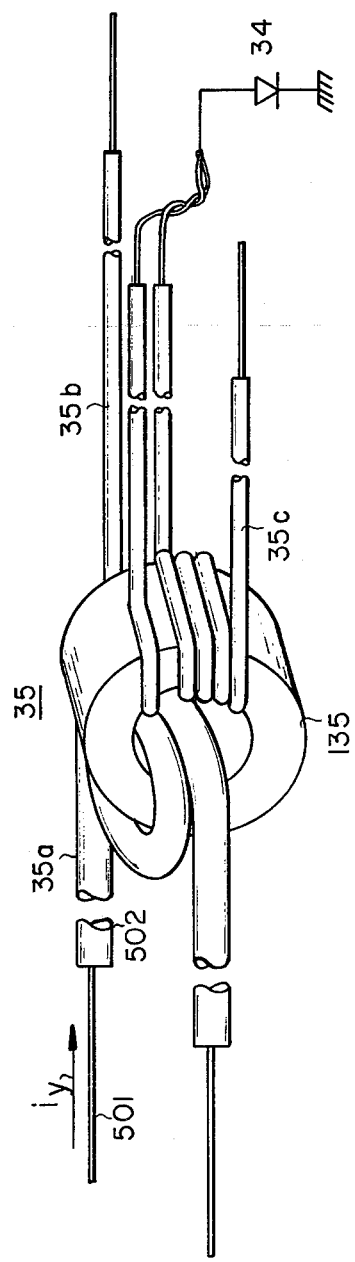
FIG. 5 illustrates a specific embodiment of the base turn-off signal transformer of FIG. 1.

FIG. 5 illustrates one construction of the signal transformer 35 of FIG. 1. Core 135 comprises a toroidal core. The core material may be a ferrite, such as RCA 540 ferrite, manufactured by RCA Corporation, Indianapolis, Ind. and similar to the ferrite material used in the core of the horizontal output transformer of the CTC-85 color television receiver manufactured by RCA Corporation.

Primary winding 35a is wound around one portion of the toroidal core. Because the scanning current $i_y$ is relatively large, only one or two turns of primary winding is required to maintain the core in magnetic saturation throughout the deflection cycle except near the zero-crossover instants of the scanning current. Secondary windings 35b and 35c are wound on different portions of the toroidal core, physically separated from primary winding 35a. Only a small number of secondary winding turns are required, one or two turns for winding 35b which provides the negative, reverse biasing voltage during retrace, and approximately four to eight turns of secondary winding 35c which provides the negative, reverse biasing voltage during trace.

Because primary winding 35a comprises only several turns, the winding conductor wire 501 may be sheathed in relatively thick insulation 502 to provide a relatively good hot/cold electrical isolation barrier between primary winding 35a and secondary windings 35b and 35c. Such a barrier is desirable to reduce electrical shock hazard since the voltages at points on primary winding 35a are referenced with respect to chassis ground, whereas the voltages at points on secondary windings 35b and 35c are referenced with respect to the earth ground connected to the AC mains source 20 of FIG. 1. Also, because primary winding 35a is physically separated from each of the secondary windings 35b and 35c, little capacitive coupling exists between the primary winding and each of the secondary windings. A relatively small AC leakage current flows between chassis ground and earth ground, resulting in relatively insignificant risks of AC capacitively coupled electrical shock hazard. Toroidal transformer 35 may be constructed of relatively small physical dimension having an inner diameter of 7.1 millimeters, an outer diameter of 12.7 millimeters, and a cross-sectional area of 13.3 square millimeters.

Figure 2:
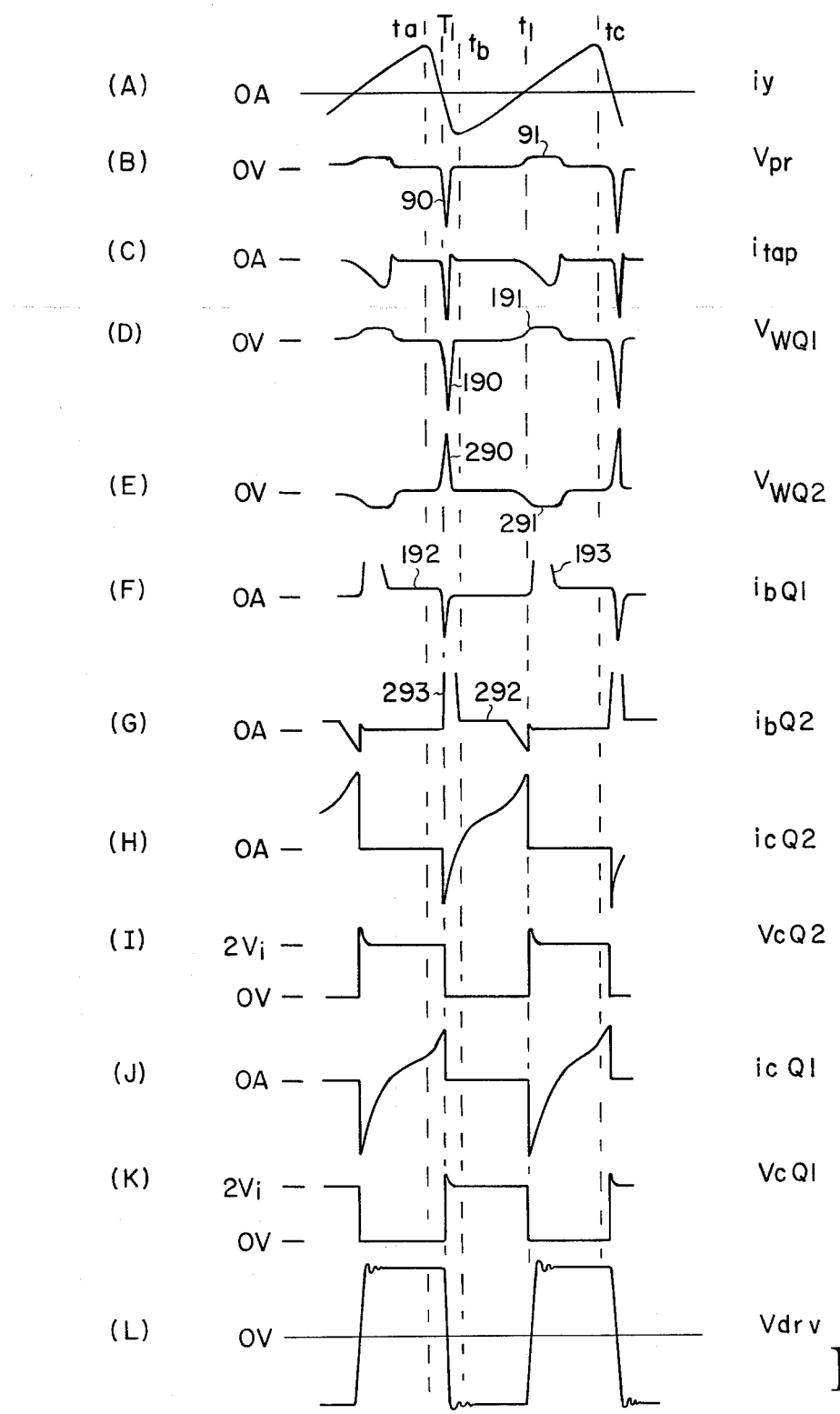
FIGS. 2-4 illustrate waveforms associated with the operation of the circuit of FIG. 1.
Figure 3:
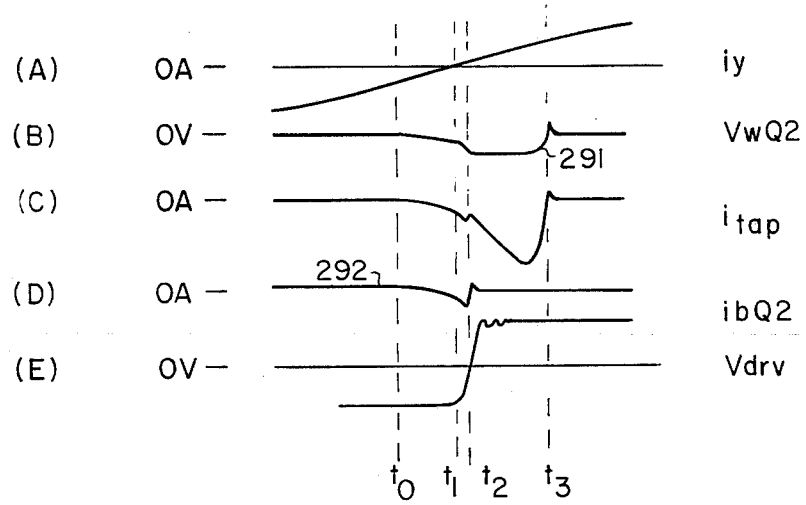
Figure 4:
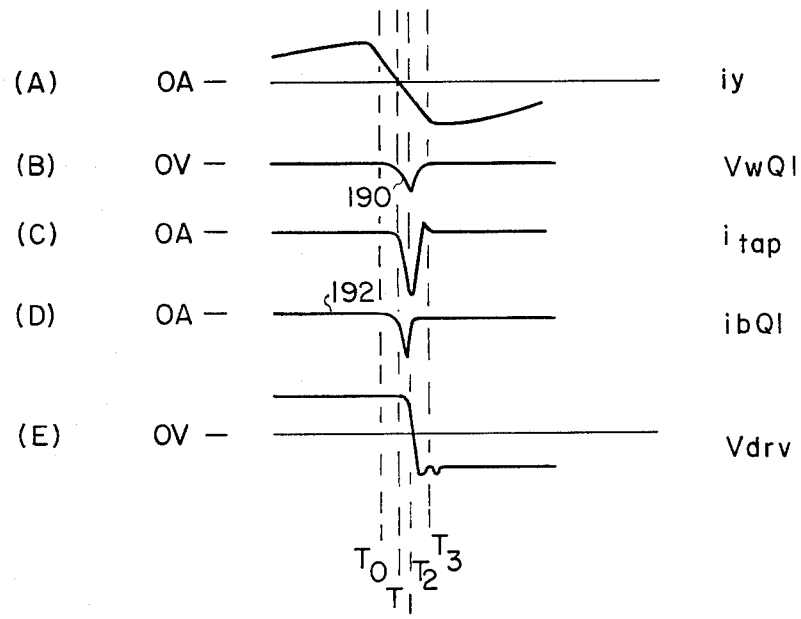

Secondary winding 35c must provide a reverse bias voltage capable of relatively rapidly sweeping out the base charge of inverter transistor Q2 near the trace instant $t_1$ of FIGS. 2 and 3. Because the scanning current di/dt during trace is less in magnitude than during retrace, it may be desirable to increase the number of turns of secondary winding 35c relative to secondary winding 35b, as illustrated in FIG. 5. Alternatively, the number of turns of primary winding 35a may be increased over that of FIG. 5 to provide a sharper negative, reverse biasing voltage across secondary winding 35c. The negative, reverse biasing voltage for transistor Q1 must then be reduced from the too great an amplitude it would otherwise have by decreasing the number of turns of secondary winding 35b and adding a series load resistance with the winding.

During the start-up interval of television receiver operation, immediately after closure of mechanical on/off switch 21 of FIG. 1, the DC voltages at terminals 38 and 57 are absent. These voltages energize horizontal deflection generator 40 and oscillator and driver 47. Thus, during the start-up interval, no deflection current $i_y$ flows to provide turn-off signals for the inverter transistors. During the start-up interval, inverter 70 is arranged to self-oscillate at a relatively low frequency until sufficient DC output voltages are developed at terminals 38 and 57 to energize horizontal deflection generator 40 and oscillator and driver 47.

Start-up current flows from input voltage terminal 25 through a start-up resistor 31 to the bases of inverter transistors Q1 and Q2. Assume, illustratively, that transistor Q1 is the first transistor to begin conducting upon initial turn-on of the television receiver. With resistor 31 providing a small amount of forward base current, transistor Q1 conducts collector current from tap terminal 28 through winding 29a, developing a positive voltage at the dotted terminal of drive winding 29c. This positive voltage is applied to the base of transistor Q1 and in a regenerative manner transistor Q1 switches into saturated conduction, with the full input voltage $V_i$ then being applied across primary winding section 29a.

With the full voltage $V_i$ applied across winding 29a, the current in primary winding section 29a and in the collector of transistor Q1 increases in magnitude to a point where a further increase in primary winding current results in a decrease in the magnitude of the voltage developed across the winding. The voltage decrease across the primary winding may be due to the transistor Q1 coming out of saturated conduction due to the high collector current levels reached and the inability of the base drive winding 29c to supply sufficient base current to maintain the transistor in saturated conduction.

Once the voltage across primary winding section 29a begins to decrease, a regenerative action occurs in that a decrease in primary winding voltage also results in a decrease of the base drive winding voltage and a decrease in base drive current. Subsequently, due to regenerative action, after cutoff of inverter transistor Q1, the voltages across the primary winding section 29a and the drive winding 29c reverse polarity, producing a turn-on of the other inverter transistor, transistor Q2. Primary winding section 29b takes over current conduction in the power transformer and a positive-going collector current begins to flow in inverter transistor Q2, the current at first being a reverse collector current and then being a forward collector current.

Turnoff of transistor Q2 occurs in a manner similar to that of the turnoff of transistor Q1. When the collector current in transistor Q2 becomes sufficiently large in magnitude to bring the transistor out of saturated conduction, the voltage in primary winding section 29b begins to decrease, and due to regenerative action, another voltage polarity reversal across primary winding section 29b and drive winding 29c occurs, resulting in the other transistor Q1 thereafter turning on, initiating the next cycle of free-running inverter operation.

In an alternative free-running mode of operation, a primary winding section output voltage may begin to decrease in magnitude, even when its respective inverter transistor is still in a saturated conduction state, if the power transformer 29 is so designed that the core under the given primary winding section begins to magnetically saturate once a predetermined peak current level has been exceeded in that section. As soon as the voltage across that primary winding section begins to decrease, regenerative action occurs, causing a voltage polarity reversal to switch conductive states in the inverter.

Figure 6:
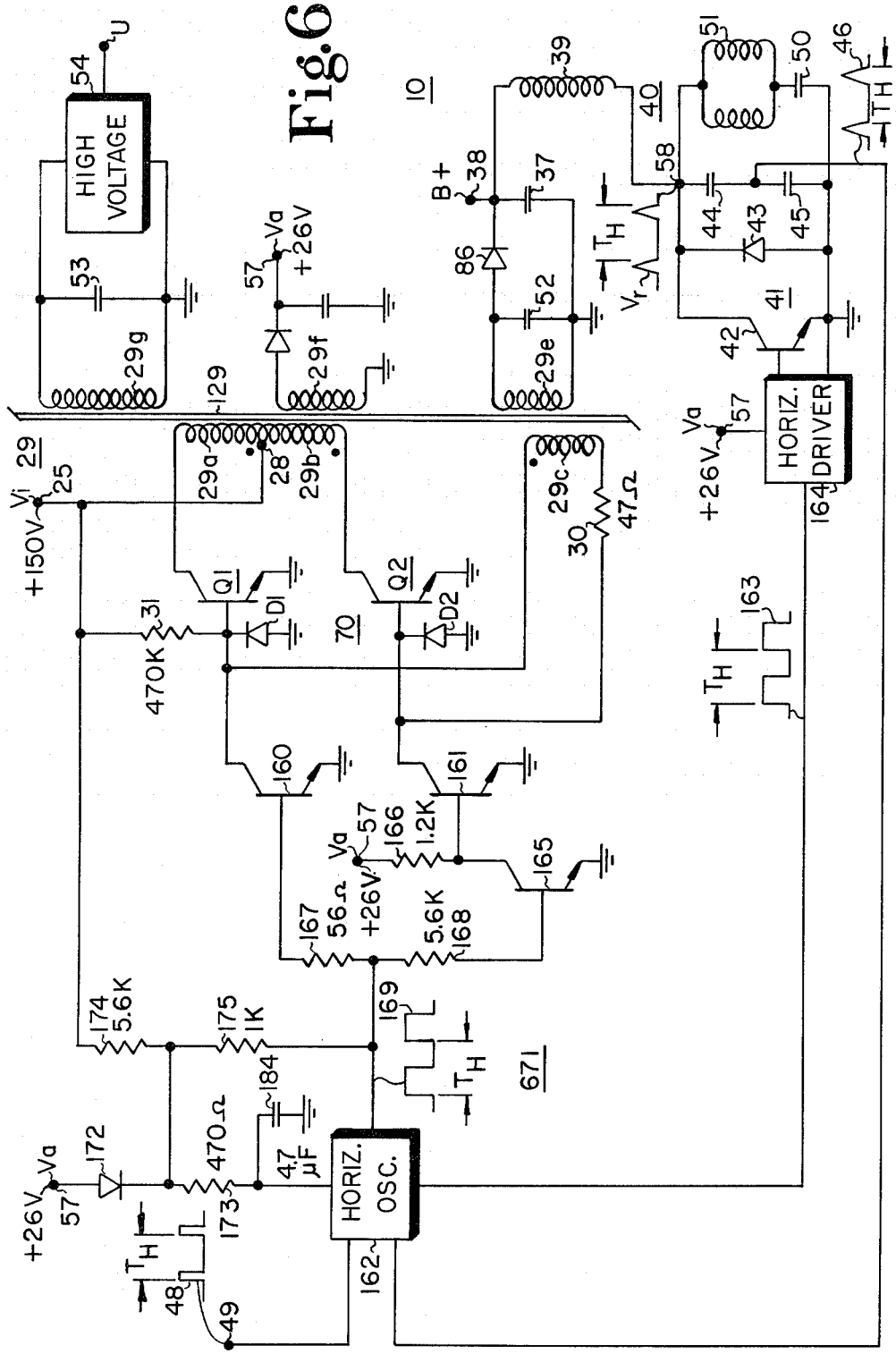
FIG. 6 illustrates another deflection circuit with a synchronized push-pull power supply embodying the invention.

FIG. 6 illustrates another embodiment of a deflection control with synchronized power supply 10 embodying the invention. Elements in the circuits of FIGS. 1 and 6 which are identically labelled function in a similar manner. Operation of the inverter circuit 70 of FIG. 6 in the free-running mode may be similar to the inverter operation of FIG. 1 and a detailed description of such a free-running operation of inverter 70 of FIG. 6 is omitted. In the circuit of FIG. 6, no isolation is provided between circuits connected to the earth ground of the mains supply from which the input voltage $V_i$ is derived and between the chassis ground to which load circuits energized by the power transformer output windings 29e–29g are connected. Also emitted in FIG. 6 is the power transformer linearity winding 29d. Thus, only the series arrangement of S-shaping capacitor 50 and horizontal deflection winding 51 is coupled across trace switch 41. Also omitted is signal transformer 35.

As in FIG. 1, one end terminal of power transformer drive winding 29c is coupled to the base of inverter transistor Q1 and the other end terminal of drive winding 29c is coupled to the base of inverter transistor Q2 through base resistor 30. Drive winding 29c, in the synchronized mode of operation of inverter 70, provides the forward base drive to inverter transistors Q1 and Q2 in a manner similar to that described for the inverter operation of the circuit of FIG. 1. Turn-off switching signals are alternately applied to transistors Q1 and Q2 by a turn-off control circuit 671.

Turn-off control circuit 671 comprises two controllable, turn-off shunting transistors 160 and 161, each coupled in shunt with the base-emitter current path of a respective inverter switch transistor Q1 or Q2. An alternating polarity, turn-off switching control signal 169 of predetermined frequency is applied to the bases of shunting transistors 160 and 161. Turn-off control signal 169 is applied to the base of transistor 160 through a resistor 167 and is applied to the base of transistor 161 through a resistor 168 and a signal inverting transistor 165. Collector supply voltage for transistor 165 and base current supply for shunting transistor 160 is obtained from the $V_a$ voltage source through a resistor 166.

Assume inverter transistor Q1 is conducting. The voltage across power transformer drive winding 29c is positive at the dotted terminal and supplies forward base current to inverter transistor Q1 to maintain the transistor in saturated conduction. Upon arrival of the leading or positive-going edge of turn-off control signal 169, shunting transistor 160 is activated into saturated conduction, thereby shunting to ground, away from the base of transistor Q1, the current flowing out of the dotted terminal of drive winding 29c. Furthermore, shunting transistor 160 conducts a reverse base current from inverter transistor Q1 to remove the charge stored in the base region of the inverter transistor. After a turn-off delay interval, transistor Q1 comes out of saturated conduction and becomes cutoff, producing a voltage polarity reversal across drive winding 29c.

With the voltage across drive winding 29c reversed in polarity, the undotted terminal of the drive winding is positive, applying forward base current to inverter transistor Q2, thereby turning on the inverter transistor to begin the alternate half cycle of inverter operation. Inverter transistor Q2 cannot turn on until inverter transistor Q1 has become cutoff, thereby substantially eliminating simultaneous conduction of both inverter transistors. Upon arrival of the trailing or negative-going edge of turn-off control signal 169, signal inverting transistor 165 becomes cutoff, enabling shunting transistor 161 to turn on to shunt drive away from inverting transistor Q2 and generate a reverse base current in that inverting transistor. After a turn-off delay interval, transistor Q2 becomes cutoff, thereby reinitiating another inverter cycle of operation.

Inverter 70 may be operated at the horizontal deflection frequency by developing the square-wave turn-off signal 169 from a conventional horizontal oscillator 162 that also applies a square-wave switching signal 163, repeating at the horizontal deflection frequency, $1/T_H$, to a horizontal driver 164. In this manner, inverter operation may be synchronized with deflection circuit scanning if desired.

During steady-state operation, supply voltage for horizontal oscillator 162 is obtained from the $V_a$ voltage source that is applied to the horizontal oscillator through a diode 172 and a resistor 173. A capacitor 184 provides filtering of the horizontal oscillator supply voltage. Also, during steady-state operation, DC base bias for transistors 160 and 165 is obtained from the $V_a$ voltage source through diode 172 and a resistor 175 coupled to the junction of resistors 167 and 168.

It may be desirable to provide start-up operation of inverter 70 using an arrangement other than the self-oscillation of the inverter transistors Q1 and Q2. In the self-oscillating inverter start-up mode, the oscillating frequency is relatively low. If a ferroresonant power transformer is used, the low exciting frequency of the voltage applied to primary winding sections 29a and 29b may result in the transformer not going into a ferroresonant mode of operation. With transformer 29 not operating in the ferroresonant mode during start-up, the output voltage $V_a$ is substantially lower during start-up than during steady-state operation. The output voltage may be so low as not to provide sufficient supply voltage to horizontal oscillator 162 and horizontal driver 164.

To provide start-up operation of the circuit of FIG. 6, a resistor 31 is coupled between the $V_i$ supply terminal 25 and the junction of the base of inverter transistor Q1 and the dotted end terminal of drive winding 29c. A resistor 174 is coupled between the input voltage supply terminal 25 and the cathode of diode 172.

During start-up, resistor 174 supplies sufficient start-up current from input terminal 25 to horizontal oscillator 162 to energize the oscillator into developing the turn-off switching signal 169. To provide the first turn-on signal to either inverter transistor Q1 or inverter transistor Q2, base current is supplied from input terminal 25 through resistor 31. Since base current to shunt transistor 161 is provided from secondary supply voltage $V_a$, transistor 161 is inoperative during start-up and thus cannot shunt away start-up current from resistor 31. Assume inverter transistor Q1 turns on first. Current flows from input terminal 25 through winding 29a and inverter transistor Q1, developing a voltage across winding section 29a and a voltage across drive winding 29c, positive at the dotted terminal, thereby regeneratively turning on inverter transistor Q1 into saturated conduction. The turn-off control signal 169 then activates shunt transistor 160 to turn off inverter transistor Q1 and reverse the polarity of the drive winding voltage to turn on inverter transistor Q2. Thus, even during the start-up interval, inverter 70 is operational to provide switching action. When the supply voltage $V_a$ developed by ferroresonant power transformer 29 is fully developed, the voltage then supplies almost the entire power requirements of horizontal oscillator 162 and the power requirements of horizontal driver 164 to enable switching action of horizontal output transistor 42 to commence.

What is claimed is:

1. A scan synchronized push-pull power supply, comprising:
    a deflection winding;
    a deflection generator coupled to said deflection winding for generating scanning current in said deflection winding during trace and retrace intervals of each deflection cycle;
    a source of DC voltage;
    a power transformer having a primary winding coupled to said DC voltage source;
    first and second controllable switches coupled to said primary winding in a push-pull arrangement;
    a signal transformer having a primary winding with scanning current flowing therein during at least a substantial portion of the trace interval for developing thereacross a deflection rate input signal that is synchronized with scanning current generation and having a secondary winding across which a turn-off switching signal is generated by the scanning current flowing in said primary winding to develop said turn-off switching signal across said secondary winding only during established portions of the deflection cycle near the zero-crossover instants of said scanning current;
    means for applying said turn-off switching signal alternately to said first and second controllable switches during each deflection cycle;
    means responsive to the turnoff of each one of the two controllable switches for applying a turn-on switching signal to the other switch when said turn-off occurs to develop a deflection rate alternating polarity output voltage across an output winding of said power transformer;
    a load circuit; and
    means responsive to said output voltage for developing an energizing potential for said load circuit.

2. A circuit according to claim 1 wherein said turn-off switching signal alternately turns off said two controllable switches, one of the switches within one of said trace and retrace intervals, the other switch within the other of said intervals.

3. A circuit according to claim 1 wherein said signal transformer includes a magnetizable core around which core said signal transformer primary and secondary windings are wound, said scanning current magnetically saturating said core during the entire deflection cycle exclusive of said established portions.

4. A circuit according to claim 3 wherein said core comprises a toroid.

5. A circuit according to claim 1 wherein said turn-on switching signal applying means comprises a drive winding of said power transformer for developing said turn-on switching signal across said drive winding.

6. A circuit according to claim 5 wherein said push-pull arrangement operates in a free-running mode in the absence of said input signal such that the current in said power transformer primary winding increases in magnitude to a point where a further increase in power transformer primary winding current results in a decrease in the magnitude of the voltage developed thereacross so as to subsequently produce a voltage polarity reversal across said power transformer primary and drive windings.

7. A circuit according to claim 6 wherein said DC voltage is applied to an intermediate terminal of said power transformer primary winding, said two controllable switches having respective common electrodes coupled together, an output electrode of each of said two controllable switches being coupled to a respective end terminal of said power transformer primary winding.

8. A circuit according to claim 7 including a first damper diode coupled to said one switch control electrode for conducting power transformer primary winding current through reverse collector conduction of said one switch.

9. A circuit according to claim 8 wherein a control electrode of each of said two controllable switches is coupled to a respective end terminal of said power transformer drive winding and including a second damper diode coupled to said other controllable switch for conducting power transformer primary winding current through reverse collector conduction of said other switch.

10. A circuit according to claim 5 wherein said power transformer comprises a ferroresonant transformer and wherein a portion of the ferroresonant transformer magnetizable core that is associated with said output winding is magnetically saturated each half cycle of said deflection rate alternating polarity output voltage for regulating said output voltage.

11. A circuit according to claim 1 wherein each of said two controllable switches comprises a transistor and including first and second damper diodes, each shunting the base-emitter current path of a respective controllable switch for conducting reverse current from said respective switch.

12. A circuit according to claim 11 wherein said power transformer comprises a ferroresonant transformer and wherein a portion of the ferroresonant transformer magnetizable core that is associated with said output winding is magnetically saturated each half cycle of said deflection rate alternating polarity output voltage for regulating said output voltage.

13. A circuit according to claim 12 wherein said load circuit includes said deflection generator and wherein said energizing potential developing means comprises rectifying means coupled to said output winding and an input choke coupled to said rectifying means and said deflection generator.

14. A circuit according to claim 13 including a high voltage winding of said ferroresonant transformer having developed thereacross a regulated high voltage and including means coupled to said high voltage winding for developing an ultor accelerating potential from said regulated high voltage.

15. A circuit according to claims 11 or 12 including a drive winding of said power transformer having respective first and second terminals coupled to the respective bases of said first and second controllable switches.

16. A circuit according to claim 1 wherein said power transformer comprises a ferroresonant transformer and wherein a portion of the ferroresonant transformer magnetizable core that is associated with said output winding is magnetically saturated each half cycle of said deflection rate alternating polarity output voltage for regulating said output voltage.

17. A scan synchronized push-pull power supply, comprising:
a deflection winding;
a deflection generator coupled to said deflection winding for generating scanning current in said deflection winding during trace and retrace intervals of each deflection cycle;
a source of DC voltage;
a power transformer having a primary winding coupled to said DC voltage source;
first and second controllable switches coupled to said primary winding in a push-pull arrangement;
a signal transformer having a primary winding with scanning current flowing therein during at least a substantial portion of the trace interval for developing thereacross a deflection rate input signal that is synchronized with scanning current generation and having a secondary winding across which a turn-off switching signal is generated;
means for applying said turn-off switching signal alternately to said first and second controllable switches during each deflection cycle;
means including a drive winding of said power transformer responsive to the turn-off of each one of the two controllable switches for applying a turn-on switching signal developed across said drive winding to the other switch when said turn-off occurs to develop a deflection rate alternating polarity output voltage across an output winding of said power transformer, said power transformer comprising a ferroresonant transformer having a magnetizable core portion associated with said output winding that magnetically saturates each half cycle of said deflection rate alternating polarity output voltage for regulating said output voltage;
a load circuit including said deflection generator; and
means responsive to said output voltage for developing an energizing potential for said load circuit including rectifying means coupled to said output winding and an input choke coupled to said rectifying means and said deflection generator.

18. A circuit according to claim 17 including a high voltage winding of said ferroresonant transformer having developed thereacross a regulated high voltage and including means coupled to said high voltage winding for developing an ultor accelerating potential from said regulated high voltage.

19. A scan synchronized push-pull power supply, comprising:
a deflection winding;
a deflection generator coupled to said deflection winding for generating scanning current in said deflection winding during trace and retrace intervals of each deflection cycle;
a source of DC voltage;
a power transformer having a primary winding coupled to said DC voltage source;
first and second controllable switches coupled to said primary winding in a push-pull arrangement;
a signal transformer having a primary winding with scanning current flowing therein during at least a substantial portion of the trace interval for developing thereacross a deflection rate input signal that is synchronized with scanning current generation and having a secondary winding across which a turn-off switching signal is generated;
means for applying said turn-off switching signal alternately to said first and second controllable switches during each deflection cycle;
means responsive to the turn-off of each one of the two controllable switches for applying a turn-on switching signal to the other switch when said turn-off occurs to develop a deflection rate alternating polarity output voltage across an output winding of said power transformer, said power transformer comprising a ferroresonant transformer having a megnetizable core portion associated with said output winding magnetically saturate each half cycle of said deflection rate alternating polarity output voltage for regulating said output voltage;
a load circuit including said deflection generator; and means responsive to said output voltage for developing an energizing potential for said load circuit including rectifying means coupled to said output winding and an input choke coupled to said rectifying means and said deflection generator.

20. A circuit according to claim 19 including a high voltage winding of said ferroresonant transformer having developed thereacross a regulated high voltage and including means coupled to said high voltage winding for developing an ultor accelerating potential from said regulated high voltage.

21. A deflection synchronized switching power supply for a television display, comprising:
a deflection winding;
a deflection generator coupled to said deflection winding for generating scanning current in said deflection winding during a deflection interval;
a signal transformer coupled to said deflection generator including a first winding located on a magnetizable core with scanning current flowing therein to maintain said core magnetically saturated except during portions of the trace and retrace intervals that encompass the zero-crossover instants of the scanning current for developing at least a first control signal indicative of the occurrence of the zero-crossover instant of said scanning current within one of the trace and retrace intervals, respectively, of said deflection interval;
a power transformer having primary, supply and drive windings;
a source of DC voltage coupled to said primary winding;
at least a first switching transistor having an output terminal coupled to said primary winding for applying said DC voltage to said primary winding during the conduction of said first switching transistor, said drive winding applying a forward drive voltage to a control terminal of said switching transistor;
turn-off means coupled to said first switching transistor control terminal including a second winding of said transformer located on said magnetizable core responsive to said first control signal for turning off said first switching transistor near said one zero-crossover instant so as to develop an alternating polarity voltage across said transformer primary winding that is substantially in-phase with said scanning current; and
a load circuit energized by the alternating polarity voltage developed across said supply winding.

22. A power supply according to claim 21 including a second switching transistor having an output terminal coupled to said primary winding and forming a push-pull arrangement with said first switching transistor, said power transformer drive winding being coupled to a control terminal of said second switching transistor for applying a forward drive voltage thereto, and wherein said control signal developing means develops a second control signal indicative of the occurrence of the zero-crossover instant of said scanning current within the other one of the trace and retrace intervals, and wherein said turn-off means is coupled to said second switching transistor control terminal and is responsive to said second control signal for turning off said second switching transistor near the zero-crossover instant within said other one of the trace and retrace intervals.

23. A power supply according to claim 22 wherein said control signal developing means comprises a signal transformer having a first winding with scanning current flowing therein and wherein said first switching transistor turn-off means comprises a second winding of said signal transformer.

24. A deflection synchronized switching power supply for a television display, comprising;
a deflection winding;
a deflection generator coupled to said deflection winding for generating scanning current in said deflection winding during a deflection interval;
a power transformer having primary and supply windings;
a source of DC voltage coupled to said primary winding;
control means coupled to said deflection generator including a signal transformer having a first winding with scanning current flowing therein to maintain said core magnetically saturated except during portions of the trace and retrace intervals that encompass the zero-crossover instants of the scanning current for developing said first and second control signals indicative of the occurrence of the zero-crossover instants of said scanning current within the trace and retrace intervals, respectively, of said deflection interval;
at least a first switching transistor having an output terminal coupled to said primary winding for applying said DC voltage to said primary winding during the conduction of said switching transistor;
first means coupled to said control means for applying a forward drive voltage to said switching transistor to turn on said transistor near the zero-crossover instant within one of said trace and retrace intervals;
second means coupled to said switching transistor and responsive to the appropriate one of said first and second control signals for turning off said switching transistor near the other zero-crossover instant so as to develop an alternating polarity voltage across said transformer primary winding; and
a load circuit energized by the alternating polarity voltage developed across said supply winding.

25. A power supply according to claim 24 including a second switching transistor having an output terminal coupled to said primary winding and forming a push-pull arrangement with said first switching transistor, said first means comprising a drive winding of said power transformer coupled to said second switching transistor for applying a forward drive voltage thereto, and wherein said second means is coupled to said second switching transistor and is responsive to the appropriate other one of said first and said second control signals for turning off said second switching transistor near the first mentioned zero-crossover instant.

26. A power supply according to claims 21 or 24 wherein said power transformer comprises a ferroresonant transformer for regulating the alternating polarity voltage developed across said power transformer supply winding.

27. A power supply according to claim 26 wherein said load circuit includes said deflection generator.

28. A power supply according to claim 26 wherein said load circuit comprises a high voltage circuit for developing an ultor voltage from the regulated alternating polarity voltage developed across said power transformer winding.

29. A power supply according to claim 28 wherein said load circuit comprises a high voltage circuit for developing an ultor voltage from the regulated alternating polarity voltage developed across said power transformer supply winding.

* * * * *